United States Patent Office 3,595,732
Patented July 27, 1971

3,595,732
PROCESS AND MICROPOROUS PRODUCT
William C. Tingerthal, Maplewood, Minn., assignor to Minnesota Mining and Manufacturing Company, St. Paul, Minn.
No Drawing. Continuation-in-part of abandoned application Ser. No. 572,216, Aug. 15, 1966. This application June 28, 1967, Ser. No. 649,468
Int. Cl. B32b 5/18, 5/32; B44d 1/02
U.S. Cl. 161—159
24 Claims

ABSTRACT OF THE DISCLOSURE

Microporous polymeric sheet materials and leather substitutes formed from polyurethane or polyurethane-urea polymers which are crosslinked by means of urethane or urea linkages, and a method of forming such materials which includes mixing the active components including an organic-polyisocyanate, a polyol, usually a polyamine, and catalyst together in a solvent, carrying out the reaction in the solvent with agitation until a dispersion of particles insoluble in the solvent is formed, forming the dispersion into a layer and completing the reaction before removal of the liquid vehicle, thus forming a crosslinked microporous layer.

This application is a continuation-in-part of my copending application Ser. No. 572, 216, filed Aug. 15, 1966 and now abandoned.

This invention relates to water vapor permeable microporous polymeric sheet materials suitable as leather substitutes and to methods for producing such materials.

Various methods have been proposed for producing leather-like sheets from polymeric materials. Such materials have not, however, been suitable for producing footwear unless the material was sufficiently porous to permit "breathing" or water vapor transmission as does natural leather. The pores in the material should be microscopic in size and invisible to the naked eye, i.e. microporous, for the sake of appearance and to provide constructions sufficiently waterproof for footwear applications.

Known methods for producing leather-like microporous polymeric materials have generally involved producing a sheet of the desired thickness from a polymer dispersion in a non-solvent for the polymer of previously polymerized material; see, for example, U.S. Patent 3,100,721 (Holden) issued Aug. 13, 1963. In the case of polyurethane polymers these methods have been limited to linear chain-extended or non-crosslinked polymeric materials due to the difficulty in processing crosslinked materials.

The present invention provides crosslinked polyurethane coatings in the formation of leather substitutes which are abrasion and heat resistant and which are significantly less thermoplastic than known non-crosslinked leather substitutes. Thus the leather substitutes of this invention have improved resistance to loss of porosity under compressive stresses. Moreover, in the shoe making process, thread ends from the stitching operation can be burned off in accordance with conventional practice without impairment of surface appearance and porosity. These new leather substitutes are also generally more solvent resistant than leather substitutes formed essentially from non-crosslinked materials. A further industrially significant advantage is that plural thicknesses of the material can be cut in one operation without edge welding, a problem which has plagued prior art materials.

The microporous films or sheet materials of the present invention consist principally of polyurethane elastomers which are chain extended and crosslinked in situ. The elastomeric materials of the present invention are particularly adaptable for use as a surface coat or top ply of a synthetic leather laminate, but they may also be used in the form of microporous sheets or self-supporting films. The sheet materials can be formed by a method employing the steps of mixing together reactive mixtures of organic materials, including a first component containing a polyisocyanate, preferably a diisocyanate, and a second component containing at least two active hydrogen atoms, preferably a mixture of a polyol and a polyamine. By "active hydrogen" is meant a hydrogen atom which displays activity according to the Zerewitinoff test described in J.A.C.S. 49, 3181 (1927). At least one of the reactive components contains a material having a functionality greater than two to cause crosslinking of the polymer. Crosslinking is achieved in the polymers of this invention by the formation of substantial amounts of urethane or urea linkages as a result of the reaction of isocyanate groups with the hydroxyl groups of a polyol or with amine groups. Crosslinking and chain extension of the polymer are thus achieved simultaneously by the same reaction mechanisms. Some crosslinking can also occur, particulary if excess diisocyanate is present, by reaction of hydrogen atoms on a urethane or urea nitrogen atom with the excess —NCO groups; these reactions occur at a much slower rate, however, and such linkages known in the art as "biuret" or "allophonate" linkages, if present at all, are only incidental to the urethane or urea crosslinks. It is greatly preferred that the —NCO groups be present in an amount about equal to the total hydroxyl and amine groups present. Due to the crosslinked nature of the polymers in the sheet materials, these materials have improved resistance to solvents, heat, flames, and abrasion.

The method of this invention provides a novel technique for reacting and crosslinking materials in situ to form a microporous product. In addition, the method has broader applications, making possible the formation of microporous non-crosslinked products chain extended during and concurrent with the formation of the reaction mixture into a microporous structure. Due to the advantages inherent in crosslinked polymers, however, the preferred product and method of this invention constitutes the formation of crosslinked materials.

The reactive components are mixed together in an inert organic vehicle in which they will either dissolve or form a highly solvated dispersion, but in which vehicle the reaction product is substantially insoluble. The mixture is agitated durinp reaction to keep the reaction product broken down into small dispersed particles as it is formed. When the reaction has progressed far enough to produce substantially insoluble particles, a coatable dispersion of the partly reacted self-croslinkable or chain-extendible polymer particles is formed in the organic vehicle. At this point reactive sites remain in the soft, gel-like particles. which become progressively harder as the molecular weight increases.

These dispersions can be cast either to form a coating or into film form, and the reaction is continued after casting in the presence of the organic vehicle until a self-supporting film is formed. The films thus produced are found to be microporous after removal of the vehicle.

In the case of reaction mixtures based on organic polyisocyanate and polyalkylene ether polyols, the reaction mixtures must be agitated vigorously during reaction to keep the reaction product broken down into small dispersed particles. In the case of these coreactants, the viscosity of the dispersion is found to go through a maximum. Prior to the attaining of this maximum viscosity, the mixture is not coatable, i.e., if agitation is discontinued a phase separation of the polymer and the organic vehicle is found to occur. After the viscosity maximum is attained, the viscosity is found to drop rapidly and a more stable, coatable dispersion is formed. The viscosity of the mixture again increases as the reaction proceeds further with continued agitation. If the dispersion is cast into sheet form after the viscosity maximum has been attained, the particles will combine to form a matrix of particles with interparticle bonding, the organic vehicle being interspersed between the particles and occupying the interstices among the particles. It is believed that it is these organic-vehicle-containing interstices which become interconnected micropores when the interparticle bonding or curing reaction proceeds to sufficient completion to produce a self-supporting sheet and the inert organic vehicle is removed.

In the case of reaction mixtures based on organic polyisocyanates and hydroxyl terminated polyesters, the reaction mixture is originally soluble in the organic vehicle. As the reaction proceeds, the viscosity of the mixture increases gradually. As the viscosity increases there is noted a gradual development of turbidity in the system as insoluble polymeric particles are produced. The reaction mixture continues to gradually increase in viscosity and develops into an opaque dispersion. The dispersion is coatable when formed, but it has been found that the microporosity of the films or coatings produced is dependent on the degree of reaction attained before coating. Greater microporosity has been found to result as the reaction is carried to a greater degree of completion before coating. The viscosity must be sufficiently high that the dispersion will maintain approximately the wet thickness at which it was coated, i.e., it will not soak into the substrate to an unwanted degree in the case of coatings, or will remain on a smooth casting surface in the case of films. This minimum viscosity is generally about 1,000 centipoises. It is preferable to cast the dispersion before it has been converted to a paste-like consistency to facilitate manufacture of the microporous articles.

In order to produce a fully cured elastomeric coating and to avoid unwanted side reactions, the reactive components should be present in approximately stoichiometric amounts, i.e. the ratio of NCO groups to active hydrogens which will coreact with the isocyanate to form urea or urethane linkages should be between about 0.9:1 to 1.3:1. The NCO and active hydrogen containing reactants may each be prepared as separate parts of a two-part reaction mixture. It is preferred, however, that a portion (less than the stoichiometric amount based on the available —NCO) of the active-hydrogen-containing constituents, e.g. a polyalkylene ether polyol or hydroxyl-terminated polyester, may be added to the isocyanate part of the two-part system in order to improve the mixing ratio, to provide crosslinking sites, and/or to increase the molecular weight of the NCO terminated material by adduct or prepolymer formation, thereby reducing the toxicity and improving the ease of pumping the same prior to mixing with the other reactants. The other part of the two-part system contains the remainder of the active-hydrogen-containing material, which is preferably a hydroxyl-terminated polyester, polyalkylene ether glycol, polyalkylene ether triol, a polyamine such as 4,4'-methylene bis(2-chloroaniline) or a mixture thereof, and, if desirable, a catalyst for the reaction of isocyanate groups and active hydrogen atoms. The resulting crosslinked microporous rubber is a tough, durable, abrasion and cut-growth resistant material which provides an ideal surface coating for leather substitutes. Particulate or fibrous fillers, dyes, plasticizers, stabilizers and pigments may also be added to alter the final properties, such as the pore structure, and to provide distinctive colors.

Various known catalysts may be used to cause the curing reaction to proceed at low temperatures. See, for example, U.S. Pat. 3,201,136 (Harrison et al.) issued Aug. 17, 1965, or U.S. Pat. 3,272,098 (Buckholtz et al.) issued Sept. 13, 1966. The preferred catalysts are organic compounds of lead and mercury or mixtures thereof In addition, when present in small amounts, PbO, while not in itself catalytic, has been found to enhance the catalytic activity (perhaps by reducing the acidity and/or moisture content of the mixture) of the organic compounds of mercury and lead and reduce the cost of the catalyst system. This effect of PbO is further enhanced by the addition of small amounts of organic calcium salts, for example, calcium octoate. Specifically the preferred catalysts are the organo-mercuric compounds containing both a C-Hg bond, and an Hg—O— bond, e.g. phenylmercuric acetate, phenylmercuric naphthenate, phenylmercuric hydroxide, and the lead or mercury salts of monocarboxylic acid, e.g. lead octoates (including lead 2-ethyl hexoate), lead naphthenate and mercuric octoate. These catalysts, and preferably mixtures thereof, cause the urethane elastomer forming systems to cure rapidly even at ambient temperatures below 150° F. (65° C.). The use of other polyurethane catalysts if necessary in the particular system, for example, organic tin compounds and the like, will be apparent to those skilled in the art.

The OH—NCO reaction is quite slow, and if the temperature is elevated, side reactions involving the isocyanate group take place preferentially. Therefore it is preferred to carry out the reaction in the presence of the above-noted metallic catalysts. While such metallic catalyst in an amount as little as 0.05 percent by weight of metal of the catalytic compound based on the total weight of the reactants in the reaction mixture will catalyze the polyurethane forming reaction at slower rates at temperatures of 100–150° F., 0.1 weight percent is the preferred lower limit. If more than 1 percent of metal is present, the resins tend to gel too fast and result in poor coatings; 0.6 percent has been found to be the preferred upper limit.

The polyol component should be sufficiently high in molecular weight and of a structure sufficient to impart the desired flexibility to the polymer chain. The preferred polyalkylene ether polyols for practice of the invention are those glycols and glycol mixtures which may be structurally represented by the formula $HO(R)_nH$ wherein R is a polyoxyalkylene radical in which the recurring alkylene units predominantly contain at least 2 carbon atoms, preferably 3 to 4. When the polyols contain recurring oxyethylene groups, at most only a minor portion (less than 50%) of the recurring oxyalkylene units should be oxyethylene. The recurring alkylene units, which may be the same or different, represent the polymeric chain forming portions of the starting polyols and/or alkylene oxides from which the polyether polyol is formed; and $n$ is an integer sufficiently large to provide a polyol or polyol mixture having a number average molecular weight between about 750 and 4500, preferably a polyol or polyol mixture having a number average molecular weight between about 1000 and 2000. Satisfactory elastomer properties are achieved by using polyoxypropylene polyols formed by chain extending a monomeric diol or polyol having 3 or more —OH groups with propylene oxide to form polyethers terminated principally with secondary hydroxyl groups. In the case of polyols terminated with primary hydroxyl groups, it is preferred to prereact the polyol with a polyisocyanate to form an isocyanate terminated prepolymer.

The polyol component may also be of the polyester type. Useful polyesters include those prepared by condensation of lactones, those prepared by esterification of a dicarboxylic acid or anhydride with an alkylene polyol and natural products such as castor oil or derivatives thereof.

The lactone-based polyesters are prepared by reaction of a bifunctional initiator with one or more lactones, as for example described in U.S. Pat. 2,933,477 (Hostettler) issued Apr. 19, 1960. Bifunctional initiators that are suitable are generally compounds having two reactive sites capable, with or without the aid of a catalyst, of opening the lactone ring and adding it onto the initiator as an open chain. Examples of useful initiators include ethylene glycol, propylene glycol, ethanol amine, and ethylene diamine. Examples of useful lactones include epsilon-caprolactone, epsilon-methyl-epsilon-caprolactone and zeta-enantholactone. The preferred lactone-based polyester is prepared from epsilon-caprolactone with ethylene glycol as the initiator. Number average molecular weights of 500 to 4000 for these essentially linear hydroxyl terminated polyesters are suitable, although a range of 800 to 2200 is preferred. Acid numbers should be less than one.

Polyesters prepared by esterification of a dicarboxylic acid or anhydride with an alkylene polyol are usually terminated with hydroxyl groups rather than carboxyl groups to avoid the formation of gaseous carbon dioxide on reaction with the isocyanate. The acid or anhydride may be selected from a wide variety of polybasic acids, such as adipic, malonic, succinic, glutaric, and others. Examples of useful alkylene polyols are ethylene glycol, 1,3-propane-diol,1,4-butanediol, etc.

The preferred crosslinking components are polyols having 3–5 hydroxyl groups per molecule. For example, a triol such as a trihydric terminated polyalkylene ether polyol (e.g. trimethylol propane or glycerol chain extended with alkylene oxides) may be used. Also, of course, monomeric triols such as glycerol, 1,2,6-hexane triol, trimethylol propane or triethanol amine, etc. can be added to the reaction mixture in lieu of or in combination with polymeric triols. Polyols having a higher functionality, for example, pentols or tetrols such as pentaerythritol may also be used. Another type of suitable crosslinking component is a modified castor oil, for example, that obtainable commercially under the trade designation "Polycin 99F," a hydroxylated castor oil derivative (polyester) having an average of 5.1 hydroxyl groups per molecule and a molecular weight of 1040. Whether polymeric or monomeric, the crosslinking polyol can be added to either or both parts of the reactive mixture. Instead of a polyol, the crosslinking component may be a polyamine, polyisocyanate or other suitable material having a functionality greater than 2. As noted above, minor amounts of additional crosslinking can also occur by interaction of hydrogens on urea or urethane linkages with —NCO groups, to form biuret or allophanate linkages.

Separate crosslinking components assist in providing a reasonably rapid rate of gelation and a tough elastomer having a low cold flow and good heat resistance. The preferred molecular weight range in the case of triols varies from about 90 to about 6,000.

Crosslinking of the product, for purposes of this invention, can be determined in accordance with a simple solubility test by observing the degree of solubility of the product in strong organic solvents (i.e., a good solvent for the particular polymer). Dimethylformamide-tetrahydrofuran mixtures are good solvents for most polyurethane polymers. Non-crosslinked products dissolve or break down completely into small particles when soaked in strong solvents. On the other hand the crosslinked materials of this invention become highly swollen, yet retain their form as an integral shape when soaked in such solvents until equilibrium is reached, which generally occurs within 24 hours, and thus may be considered substantially insoluble. The preferred mixture of these solvents consists of 86.2% tetrahydrofuran and 13.8% dimethylformamide. See Polyurethane Chemistry and Technology, Part 1, Saunders & Frisch, J. Wiley & Sons, New York 1963, page 299.

The extent of crosslinking can be measured by testing a nonporous film of the same composition in accordance with the equilibrium modulus measurement method reported in Physics of Rubber Elasticity, Treloar, Oxford Univ. Press, London, 1958. For sheet materials intended for use as synthetic shoe uppers, it is preferred that the average molecular weight of polymer between covalent crosslinks should be between 1,000 and 50,000. If the average molecular weight between crosslinks is less than 1,000, the sheet material tends to be excessively stiff for such applications. In order to provide good curing and a sheet material having adequate physical properties the average molecular weight between crosslinks should not be over 50,000. Greater latitude may be permissible, however, in applications other than shoe upper materials.

A polyamine component in the reaction mixture provides increased tear strength, hardness and tensile strength. It is preferred that the polyamine component be present in an amount such that the urea linkages formed constitute about 5 to 75 percent of the total urethane and urea linkages in the polymer. If less than 10 percent urea linkages are present the elastomer will generally be too weak for synthetic shoe upper material. If more than 60 percent of the linkages are urea linkages, the resin will be too hard and stiff for synthetic shoe upper material.

Although the useful polyamine may be primary or secondary amines and may be aliphatic, aromatic, or heterocyclic polyamines, the preferred polyamines are aromatic diprimary diamines, such as 4,4'-methylene bis (2-chloroaniline). Various other suitable polyamines will be apparent to those skilled in the art, for example p-xylylenediamine, 1,4 - diaminocyclohexane, p - phenylenediamine, 1-methyl-2,4-diaminobenzene, bis(p-aminocyclohexyl)methane, N,N' - dimethyltetramethylenediamine, N,N' - dimethylphenylenediamine, N,N'-dimethyl-p-xylylenediamine, N,N'-dimethyl-1,4-diaminocyclohexane, piperazine, trans - 2,4 - dimethylpiperazine, 4,4'-diaminodiphenyldisulfide can be used. Other suitable polyamines include polyether polyamines of, for example, 2,000 molecular weight.

To avoid incompatibility it is preferred to use co-reactants, e.g. polyols and diamines, having reaction rates of the same order of magnitude. Alternatively the isocyanate can be reacted separately with coreactants having differing reaction speeds in sequence, for example, by first forming an —NCO terminated prepolymer which is then reacted with further active hydrogen-containing material. As will be apparent to those skilled in the art, the relative reaction rates can be altered in the case of reactants originally having divergent reaction rates by changing the catalyst system, solvents, concentrations of reactants, etc.

Organic polyisocyanates and particularly the various aliphatic and aromatic diisocyanates or mixtures of these diisocyanates are useful in the practice of this invention. Representative of such polyisocyanates are hexamethylene diisocyanate, naphthalene - 1,5 - diisocyanate, para-phenylene diisocyanate, tolylene diisocyanate (TDI), p,p'-diphenyl methane diisocyanate (MDI) and polyarylpolyisocyanate (P.A.P.I.). As illustrated in the accompanying examples, all or a portion of the isocyanate component can be added in the form of a polyurethane prepolymer.

The reaction of a two-part system is carried out in an inert liquid vehicle in which the starting materials are at least partially soluble (including highly solvated dispersions and true solutions) but in which the polyurethane reaction product is insoluble. Various organic liquids such as toluene, heptane, benzene, cyclohexane, methyl etheyl ketone, or mixtures thereof, are suitable. The particular liquid is preferably also selected with due regard for the convenient dispersibility of the reaction product therein. As the reaction proceeds the mixture must be continuously agitated to prevent the irreversible formation of an agglomerate of elastomer.

As noted above, it has been discovered that the viscosity of the mixture increases to a maximum in the case of reaction mixtures based on polyalkylene ether polyols. Prior to the time that this maximum is reached there is a tendency for a separation to occur between the organic liquid and the polyether polyurethane into stratified layers and thus the mixture cannot be coated into a layer with a knife coater. When the maximum viscosity is reached, particles of polyurethane are present which remain suspended in the liquid, and the viscosity decreases markedly as the mixture appears to homogenize into a creamy dispersion. The casting of the reaction mixture into a continuous film or coating a substrate is accomplished after the tendency to separate into stratified layers has passed, usually shortly after the drop in viscosity occurs. If coating or casting is done prior to this time separation into layers would tend to occur in the cast sheet, and a uniform product would not be obtained. If the reaction is continued beyond the point of viscosity decrease from the maximum, the viscosity will again increase and, after a short time, generally about 10 minutes in the case of the preferred formulations, the mixture becomes too viscous to be readily coated or cast. After casting or coating, the material continues to react or cure with the formation of a strong insoluble layer which is microporous if the liquid vehicle is not removed before the cure is essentially complete. This can be accomplished, for example, by continuing the curing reaction in a bath of non-solvent, such as mineral spirits, until a self-supporting structure is formed. In the case of polyesters it is preferred to first react the polyester with an excess of polyisocyanate to form an —NCO terminated prepolymer. This prepolymer is then dissolved in the liquid vehicle together with additional active-hydrogen containing coreactant, such as a diamine. As the reaction proceeds, a cloudy dispersed product insoluble in the vehicle is formed. This mixture can then be cast to form a film or coated on a substrate. The cast material is then further reacted or cured in a non-solvent for the polymer until a microporous breathable self-supporting film is formed.

Microporous materials of this invention can be prepared in situ on a porous backing such as a heat shrunken impregnated non-woven web or batt, cloth, reconstituted leather, and flexible, tough, water vapor permeable backings, to form leather-like sheets suitable for use in formation of shoe uppers, hand bags, upholstery, etc. Alternatively, the microporous materials can be first formed into self-supporting sheets or films, then adhesively bonded to suitable backings. Leather substitutes thus produced can be supplied in continuous lengths to leather product manufacturers.

For wearer comfort, the top ply or coating of leather substitutes suitable for shoe upper material should have a minimum water vapor transmission (W.V.T.) rate of 1,500, preferably at least 2,000 gm. $H_2O$ per 100 square meters per hour as measured by ASTM Test No. E96–63T, procedure B. The tensile strength and other physical properties of the films or coatings of this invention can be significantly improved with only a slight decrease in W.V.T. by impregnating the cured film or coating with a moisture curable —NCO terminated polyurethane prepolymer and curing by means of atmospheric moisture. It is generally preferred to wipe the impregnated film surface with a suitable blade, squeeze roll, or other means to remove excess prepolymer from the film surface. Typically such treatment will provide a 300% increase in tensile strength and a 400% increase in elongation of the film, while decreasing the W.V.T. only about 30%. Such post treatment thus apparently reinforces the film structure without closing the pores. It is preferred to use such post treatments where optimum physical properties are desired, for example, in shoe upper materials.

While principal use of the microporous sheet materials of this invention is in leather substitutes, other uses will readily be apparent, for example, microporous bandages, permeable membranes, stamp pads, print rolls, apparel, hospital bed sheets, surgical drapes, etc.

The invention will be further illustrated but not limited by the following examples in which all parts are given by weight unless otherwise indicated.

EXAMPLE I

The following ingredients were mixed together at room temperature in a one-gallon container:

Part A

| | Parts |
|---|---|
| Reagent grade heptane | 669 |
| Reagent grade toluene | 31 |
| 2000 m.w. polyoxypropylene glycol | 461 |
| Calcium salt of 2-ethyl hexoic acid | 2.5 |
| Phenyl mercuric acetate (catalyst) | 1.2 |
| Tributyl substituted phenol (an anti-oxidant) | 2.5 |
| PbO | 1.2 |
| Silicon dioxide pigment (thickener) | 25.6 |
| 4,4'-methylene bis(2-chloroaniline) | 131 |

The following ingredients were mixed and prereacted in a separate vessel and then added to the Part A.

Part B

| | Parts |
|---|---|
| Tolylene diisocyanate | 213 |
| 400 m.w. polyoxypropylene glycol | 107.5 |
| 400 m.w. polyoxypropylene triol | 21.5 |

The mixture was initially a highly solvated dispersion. The mixture was agitated during reaction by an Eppenbach homomixer, first at a slow speed and at progressively increasing rates of mixing as the viscosity of the mixture increased. Upon continued mixing the viscosity was found to rise to a maximum. As the maximum was reached a great tendency was noted toward phase separation of the polymer particles from the liquid phase. On continued mixing, after 12 minutes of total mixing, the viscosity dropped greatly and a creamy homogeneous dispersion resulted. The speed of mixing was gradually reduced and the batch was removed from the mixer at 13 minutes. The viscosity again began to increase while the dispersion was hand mixed until a good coating viscosity was reached at about 18 minutes. The dispersion was then knife-coated onto a polyethylene terephthalate carrier film using a 30 mil coating orifice. The cast films were immersed in a mineral spirits bath for about 24 hours until the reaction was completed to a point where a self-supporting microporous film was produced. The film was 14 mils thick and had a water vapor transmission rate of 7200 gm. $H_2O$ per 100 $M^2$ per hour. The fully cured film had tensile strength of 150 lb./in.$^2$ and elongation at break of 48%. The material had an extremely fine matte finish surface and was suitable as a surface cotaing for leather-like products.

A curable polyurethane prepolymer solution of the following composition was applied to the cured microporous film by dipping:

| | Parts |
|---|---|
| Polyurethane prepolymer-reaction product of tolylene diisocyanate and polytetramethyleneether glycol, NCO equivalent weight 1000 (Adiprene L–100) | 100 |
| Toluene | 300 |
| Stannous octoate | 0.5 |

The microporous film was thoroughly impregnated with the solution, and excess solution was wiped from the film surface after removal of the film from the solution. The solution was air dried and cured with atmospheric moisture. After this treatment the film had a tensile strength of 646 p.s.i., elongation at break of 230%, and a water vapor transmission rate of 6100. Crosslinking of the product was indicated by the fact that the sheet material swelled but was substantially insoluble in good organic solvents such as dimethylformamide-tetrahydrofuran mixtures.

EXAMPLE II

The following ingredients were mixed together at room temperature:

Part A

| | Parts |
|---|---|
| Reagent grade heptane | 650 |
| Reagent grade toluene | 450 |
| 2000 m.w. polyoxypropylene glycol | 332 |
| Calcium salt of 2-ethyl hexoic acid | 0.9 |
| Phenyl mercuric acetate (catalyst) | 0.9 |
| Tributyl substituted phenol (an anti-oxidant) | 1.8 |
| PbO | 0.9 |
| Silicon dioxide pigment (thickener) | 18.5 |
| 4,4'-methylene bis(2-chloroaniline) | 94.5 |

The following ingredients were mixed and prereacted in a separate vessel and then added to the Part A.

Part B

| | Parts |
|---|---|
| Tolylene diisocyanate | 112 |
| 400 M.W. polyoxypropylene glycol | 56.7 |
| 400 M.W. polyoxypropylene triol | 11.3 |
| Polyurethane prepolymer-reaction product of tolylene diisocyanate and polytetramethylene ether glycol, NCO equivalent weight 1000 (Adiprene L-100) | 255 |

The mixtures were agitated and reacted as in Example I with the exception that the total mixing time required was 25 minutes. The dispersion was knife coated onto a carrier film as in Example I and a polyester-cotton cloth was applied over the wet coating prior to immersion in the mineral spirits bath. The free film was also formed from the dispersion without a cloth backing and cured as in Example I. The film was 14 mils thick and had a water vapor transmission rate of 3200 gm. $H_2O$ per 100 $M^2$ per hour. The fully cured film had a tensile strength of 450 lb./in.$^2$ and an elongation at break of 390%. The product swelled but was substantially insoluble in dimethylformamide-tetrahydrofuran mixtures. This product was finished with a conventional leather finish and adhesively bonded to a porous latex impregnated nonwoven fibrous backing. The laminate was suitable for use as a shoe upper material which was durable, scuff resistant and comfortable.

EXAMPLE III

The following ingredients were mixed together, reacted and formed into a film as in Example I:

Part A

| | Parts |
|---|---|
| Reagent grade heptane | 217 |
| Technical grade toluene | 83 |
| 2000 M.W. polyoxypropylene glycol | 160.5 |
| Calcium salt of 2-ethyl hexoate | .87 |
| Phenyl mercuric acetate (catalyst) | .43 |
| Tributyl substituted phenol | .87 |
| PbO | .43 |
| Silicone dioxide | 8.9 |
| 4,4' - methylene bis(2 - chloroaniline) | 45.7 |

Part B

| | Parts |
|---|---|
| Tolylene diisocyanate | 70.7 |
| 2000 M.W. polyoxypropylene glycol | 16.6 |
| Tripropylene glycol | 17.1 |

The resulting product is non-crosslinked as indicated by the ready solubility of the sheet material in organic solvents such as dimethylformamide. The sheet material had a water vapor transmission rate of 2580 gm. $H_2O$ per 100 $M^2$ per hour, a tensile strength of 535 lb./in.$^2$ and an elongation at break of 165%.

EXAMPLE IV

The procedure of Example II was carried out on a continuous basis by pumping the parts A and B of the reaction mixture in the same ratio given in Example II, by means of a pair of gear driven metering pumps powered by a single drive to provide the desired mixing ratio, into the bottom of a vertical glass pipe which served as a mixer-reactor. The pipe which had an inside diameter of 4 inches and a height of 30 inches was divided into six mixing chambers by means of tight fitting wafers. A single drive shaft ran through the center of these wafers and powered one or two flat 2 inch turbine blades in each compartment. The compartments were connected by a small (¼ inch diameter) part in each wafer. Mixing between chambers was minimized by the size of the ports and the positioning of the turbines; thus the material in the bottom chamber was relatively unreacted, while the top chamber contained reacted, dispersed material, ready for coating. A suitable product was formed when the feed rate of the pumps was adjusted to allow a 20 minute dwell time in the reactor, the turbines were rotating at 3550 r.p.m. and the temperature of the final chamber was allowed to rise to 55° C. A port was provided in the side of the reactor above the top chamber, from which the final dispersion was allowed to flow at a rate determined by the feed pumps. The dispersion flowing from the port was knife-coated onto a carrier film as in Example I, and a cloth was applied over the wet coating as in Example II. The coated cloth was then cured in a mineral spirits bath as in Example I to form a tough microyporous coating. The coated cloth had a W.V.T. of 3500 gm. $H_2O$ per 100 $M^2$ per hour. The product was swelled but was substantially insoluble in dimethylformamide-tetrahydrofuran mixtures.

EXAMPLE V

The following ingredients were mixed together at room temperature:

| | Parts |
|---|---|
| Reagent grade toluene | 222.6 |
| Polyurethane prepolymer NCO equivalent weight 714—reaction product of P,P' - diphenyl methane diisocyanate (MDI) and 830 molecular weight dihydroxy terminated polycaprolactone (Niax Polyol D-520) | 90.0 |
| Polyurethane prepolymer NCO equivalent weight 1225—reaction product of MDI and 2000 molecular weight hydroxy terminated poly e-caprolactone (Niax Polyol D-560) | 90.0 |
| 4,4' - methylene bis(2 - chloroaniline) (MOCA) | 25.4 |
| Reagent grade cyclohexane | 39.0 |

The mixture, excluding the cyclohexane, was agitated lightly for eight minutes after the addition of the MOCA, in which time the MOCA was essentially dissolved. The cyclohexane was added at this point and light mixing continued. The appearance gradually changed from transparent to cloudy and the viscosity increased until after about thirty-six minutes, the mixture was a creamy, opaque white dispersion which was difficult to pour because of its high viscosity. At this time the dispersion was coated as in Example II, and a cloth was applied to the top surface. The composition was immersed in a mineral spirits bath. The composite after cure of the polymer had a water vapor transmission (WVT) rate of 2680 gms. $H_2O$ per 100 $M^2$ per hour and a total thickness (with the cloth) of 19 mils. The microporus coating was soluble in dimethylformamide.

EXAMPLE VI

The following ingredients were mixed together at room temperature:

| | Parts |
|---|---|
| Reagent grade toluene | 221.3 |
| Polyurethane prepolymer NCO equivalent weight 714—reaction product of MDI and Niax Polyol D-520 | 90.0 |

| | Parts |
|---|---|
| Polyurethane prepolymer NCO equivalent weight 1225—reaction product of MDI and Niax Polyol D-560 | 90.0 |
| MOCA | 22.7 |
| Triethanolamine | 1.0 |
| Reagent grade cyclohexane | 39.0 |

The mixture was reacted and coated as in Example V except that portions were coated at 24 minutes, 27 minutes, 30 minutes, and 33 minutes after the addition of the MOCA. The resulting microporous films had WVT rates of 1850, 2370, 3430 and 4420 respectively. The product swelled but was substantially insoluble in dimethylformamide-tetrahydrofuran mixtures.

What is claimed is:

1. A water-vapor permeable, microporous material substantially free of visible pores comprising a cast film having microscopically small interconnected pores uniformly distributed therethrough, said film comprising a matrix of cross-linked, chain-extended polyurethane particles, said particles being chemically bonded together at cross-linkable and chain-extendable sites therein, the major amount of cross-links in said polyurethane being selected from the group consisting of urethane linkages, urea linkages, and mixtures thereof and the average molecular weight between the said urethane or urea cross links of said polyurethane being between about 1000 and about 50,000, said crosslinked property being evidenced by the substantial insolubility of the said polyurethane in dimethyl formamide-tetrahydrofuran mixtures.

2. A material according to claim 1 wherein: said polyurethane contains 5-75% urea linkages and is cured in situ at temperatures below 150° F. from a reaction mixture comprising an aromatic polyisocyanate; an organic active-hydrogen-containing component, said active hydrogen-containing component comprising a polyalkylene ether glycol, a polyalkyleneether polyol having at least three hydroxyl groups, and an organic polyamine; and a catalytic amount of an organo-mercuric compound, said urea linkages resulting from the chemical reaction of said polyisocyanate and said organic polyamine, and said urethane crosslinks result from the chemical reaction of said polyisocyanate with said polyol.

3. A material according to claim 1 wherein said polyurethane is a polyether urethane.

4. A material according to claim 1 wherein said polyurethane is a polyester urethane.

5. A material according to claim 4 wherein the polyester portion of the said polyester urethane is derived from epsilon-caprolactone diol.

6. A material according to claim 1 wherein said polyurethane is a polyurethane-polyurea.

7. A leather substitute comprising a porous flexible backing having bonded thereto a sheet material according to claim 6.

8. A sheet material according to claim 7 wherein said polyamine is 4,4'-methylene bis(2-chloroaniline), and wherein said polyurethane contains 10-60% urea linkages.

9. A method of making a microporous sheet material comprising:
    (1) carrying out an NCO/amine reaction in a polyurethane-forming reaction mixture comprising a liquid organic vehicle, an organic polyisocyanate, and an organic polyamine,
    (2) agitating said reaction mixture until a dispersion of insoluble, gel-like polyurethane particles having chain-extendible sites therein has been produced,
    (3) casting said dispersion onto a substrate prior to the completion of said NCO/amine reaction to form a matrix of said particles, and
    (4) substantially preventing evaporation of said liquid organic vehicle until said reaction is completed and said matrix forms a self-supporting structure containing interparticulate bonding.

10. A method according to claim 9 wherein said organic polyisocyanate is selected from the group consisting of an aromatic diisocyanate, an aliphatic diisocyanate, an isocyanate-terminated polyurethane prepolymer, and mixtures thereof.

11. A method according to claim 10 wherein said prepolymer contains more than two isocyanate groups.

12. A method according to claim 10 wherein said prepolymer contains a polyoxyalkylene chain.

13. A method according to claim 10 wherein said prepolymer contains a polyester chain.

14. A method according to claim 9 wherein said reaction mixture contains a polyol.

15. A method according to claim 14 wherein said polyol contains 3-5 hydroxyl groups per molecule.

16. A method according to claim 9 wherein said organic polyamine comprises an aromatic diprimary amine.

17. A method according to claim 16 wherein said diprimary amine is 4,4'-methylene-bis(2-chloroaniline).

18. A method according to claim 9 wherein said reaction mixture contains a catalyst.

19. A method according to claim 9 wherein said agitating step is carried out until after a maximum in the viscosity of said reaction mixture has been reached.

20. A method according to claim 9 wherein said evaporation-preventing step is carried out by immersing said cast dispersion in a mineral spirits bath.

21. A method according to claim 9 wherein an NCO/OH reaction occurs simultaneously with said NCO/amine reaction.

22. A method according to claim 21 wherein said NCO/OH reaction involves a polyol and provides sites for crosslinking of polymer chains.

23. A method according to claim 9 wherein the polyurethane in the microporous sheet material produced by said method contains 5-75% urea linkages.

24. A method according to claim 9 wherein
    (5) the said self-supporting structure is impregnated with a solution of a polyurethane prepolymer, said solution containing a catalyst, and
    (6) said solution is air dried and cured with atmospheric moisture.

References Cited

UNITED STATES PATENTS

| | | | |
|---|---|---|---|
| 3,100,721 | 8/1963 | Holden | 117—135.5 |
| 3,281,396 | 10/1966 | Barnes | 260—77.5MP |
| 3,296,016 | 1/1967 | Murphy | 260—77.5MP |
| 3,348,963 | 10/1967 | Fukishima et al. | 117—135.5 |
| 3,398,042 | 8/1968 | Odenthal et al. | 161—190 |
| 3,284,274 | 11/1966 | Hulslander et al. | 161—159 |

FOREIGN PATENTS 727,321 3/1955 Great Britain.

WILLIAM J. VAN BALEN, Primary Examiner

U.S. Cl. X.R.

117—62.2, 135.5, 161, 138.8; 161—162, 164, 168, 190; 260—2.5